United States Patent [19]

Goodreau

[11] Patent Number: 5,683,816
[45] Date of Patent: Nov. 4, 1997

[54] PASSIVATION COMPOSITION AND PROCESS FOR ZINCIFEROUS AND ALUMINIFEROUS SURFACES

[75] Inventor: Bruce H. Goodreau, Shelby Township, Mich.

[73] Assignee: Henkel Corporation, Plymouth Meeting, Pa.

[21] Appl. No.: 590,258

[22] Filed: Jan. 23, 1996

[51] Int. Cl.$^6$ .............................. B32B 15/08; B32B 27/00
[52] U.S. Cl. .................. 428/461; 106/14.12; 106/14.21; 148/251; 148/253; 427/388.4; 427/435
[58] Field of Search ...................... 427/327, 384, 427/388.4, 435; 106/14.12, 14.21; 148/251, 253; 428/461

[56] References Cited

U.S. PATENT DOCUMENTS

| | | | |
|---|---|---|---|
| 4,040,842 | 8/1977 | Makishima et al. | 106/1 |
| 4,264,378 | 4/1981 | Oppen et al. | 148/6.15 |
| 4,385,940 | 5/1983 | Kirihara et al. | 148/6.15 |
| 4,427,499 | 1/1984 | Hitomi et al. | 204/27 |
| 4,846,898 | 7/1989 | Natalie et al. | 428/469 |
| 5,066,540 | 11/1991 | Mosser et al. | 148/258 |
| 5,139,700 | 8/1992 | Miksic et al. | 252/389.54 |
| 5,194,138 | 3/1993 | Mansfeld et al. | 205/183 |
| 5,377,494 | 1/1995 | Takagi et al. | 62/102 |
| 5,419,790 | 5/1995 | Miller | 428/471 |
| 5,424,007 | 6/1995 | Pera et al. | 252/389.23 |
| 5,449,415 | 9/1995 | Dolan | 148/259 |
| 5,486,316 | 1/1996 | Bershas et al. | 134/34 |

FOREIGN PATENT DOCUMENTS

WO 9310278    5/1993    WIPO.

OTHER PUBLICATIONS

*Molybdate–Based Alternatives to Chromating as a Passivation Treatment for Zinc*, Tang et al., Plating and Surface Finishing, Nov. 1994, pp. 20–23.

*Chromate–free Surface Treatment: MolyPhos—A New Surface Conversion Coating for Zinc. Optimising the Treatment by Corrosion Testing*, Bech–Nielsen et al., Euro. Fed. Corrosion Pub., 194, v. 12, pp. 195–197, no date.

*Primary Examiner*—Michael Lusignan
*Attorney, Agent, or Firm*—Wayne C. Jaeschke; Norvell E. Wisdom, Jr.; Beatrice N. Robbins

[57] ABSTRACT

Zinciferous and/or aluminiferous metal surfaces can be passivated by treatment with a chromium-free aqueous solution of phosphoric acid and molybdenum that is at least partially in a valence state lower than +6, to produce, especially with an acrylic overcoating, a surface as resistant to corrosion as the surface of the same substrate after passivation with conventional liquid compositions that contain hexavalent chromium.

20 Claims, No Drawings

PASSIVATION COMPOSITION AND PROCESS FOR ZINCIFEROUS AND ALUMINIFEROUS SURFACES

BACKGROUND OF THE INVENTION

1. Field of the Invention

This invention relates to compositions and processes for passivating, i.e., forming a corrosion protective surface layer, on metal surfaces that consist predominantly of aluminum and/or zinc. A wide variety of such surfaces are in normal use, including many kinds of galvanized and/or aluminized steel, and the invention is applicable to such surfaces which differ from the underlying metal, as well as to solid alloys of aluminum and/or zinc. In fact, the invention is particularly advantageous for use on a surface of 55% aluminum, 43.5% aluminum, and 1.5% Si that is often itself used as a coating on underlying steel.

2. Statement of Related Art

Traditionally, most zinciferous and/or aluminiferous surfaces have been passivated by chemical treatment with aqueous liquid compositions containing at least some hexavalent chromium. However, the adverse environmental effects of hexavalent chromium that have come to public attention in recent years have resulted in development of alternative, chromium-free compositions for this purpose. A combination of molybdate and phosphate has been recommended for this purpose by workers from the Centre for Advanced Electroplating of the Technical University of Denmark. However, no chromium-free passivating treatment previously known has been found to be suitable for all commercial uses for which replacement of chromium-containing treatments have been desired.

DESCRIPTION OF THE INVENTION

Object of the Invention

Various alternative and/or concurrent objects of this invention are: (i) to provide an entirely or substantially chromium-free composition and process for passivating that will provide an adequate corrosion resistance in comparison with previously used high quality chromate containing passivating agents; (ii) to provide an economical passivating treatment; and (iii) to reduce pollution potential.

General Principle of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not preclude chemical interactions among the constituents of a mixture once mixed; specification of materials in ionic form implies the presence of sufficient counterions to produce electrical neutrality for the composition as a whole; any counterions thus implicitly specified should preferably be selected from among other constituents explicitly specified in ionic form, to the extent possible; otherwise such counterions may be freely selected, except for avoiding counterions that act adversely to the objects of the invention; the terms "molecule" and "mole" and their grammatical variations may be applied to ionic, elemental, or any other type of chemical entities defined by the number of atoms of each type present therein, as well as to substances with well-defined neutral molecules; the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, varnish, shellac, topcoat, and the like; and the term "polymer" includes "oligomer", "homopolymer", "copolymer", "terpolymer", and the like.

SUMMARY OF THE INVENTION

It has been found that one or more of the objects stated above for the invention can be achieved by the use of a passivating aqueous liquid composition that comprises, preferably consists essentially of, or more preferably consists of, water and:

(A) dissolved phosphate anions;

(B) dissolved, stably dispersed, or both dissolved and stably dispersed molybdenum-containing anions, compounds, or both compounds and anions in which molybdenum has an oxidation state less than +6; and, optionally, one or more of the following:

(C) a dissolved, stably dispersed, or both dissolved and stably dispersed component selected from the group consisting of reducing agents, non-molybdenum-containing products from reactions in which the reducing agents reduce other material, or both, said reducing agents and products from reactions thereof not being part of either of previously recited components (A) and (B);

(D) dissolved, stably dispersed, or both dissolved and stably dispersed molybdenum-containing anions, compounds, or both compounds and anions which are not part of any of previously recited components (A) through (C) and in which molybdenum has an oxidation state of +6;

(E) a dissolved component selected from the group consisting of simple and complex anions containing fluorine atoms, said anions not being part of any of previously recited components (A) through (D);

(F) a component of dissolved, stably dispersed, or both dissolved and stably dispersed metal oxide or metal oxides that are not part of any of the previously recited ed components (A) through (E); and (G) a component of surfactant that is not part of any of the previously recited components (A) through (F).

The phrase "stably dispersed" when used herein to describe an insoluble component in a liquid continuous phase, as in the definitions of components (B), (C), (D), and (F) recited above, means that the insoluble component is not spontaneously concentrated into any separate liquid or solid phase perceptible with unaided human vision as distinct from, but in contact with, the liquid continuous phase within a period of observation of the combination of stably dispersed insoluble component and liquid continuous phase for 10 hours, or preferably, with increasing preference in the order given, for 1, 3, 5, 10, 30, 60, 90, 120, 240, or 360 days.

Various embodiments of the invention include working compositions for direct use in treating metals, make-up concentrates from which such working compositions can be prepared by dilution with water, replenisher concentrates suitable for maintaining optimum performance of working compositions according to the invention, processes for treating metals with a composition according to the invention, and extended processes including additional steps that are conventional per se, such as cleaning, rinsing, and subsequent painting or some similar overcoating process that puts into place an organic binder-containing protective coating over the metal surface treated according to a narrower embodiment of the invention. Articles of manufacture including surfaces treated according to a process of the invention are also within the scope of the invention.

DESCRIPTION OF PREFERRED EMBODIMENTS

For a variety of reasons, it is sometimes preferred that compositions according to the invention as defined above should be substantially free from many ingredients used in compositions for similar purposes in the prior art. Specifically, when maximum storage stability of a concentrate, avoidance of possibly troublesome anions, and/ or minimization of pollution potential is desired, it is preferred, with increasing preference in the order given, independently for each preferably minimized component listed below, that these compositions contain no more than 25, 15, 9, 5, 3, 1.0, 0.35, 0.10, 0.08, 0.04, 0.02, 0.01, 0.001, or 0.0002, percent of each of the following constituents: nitrite; halates and perhalates (i.e., perchlorate, chlorate, iodate, etc.); hydroxylamine and salts and complexes of hydroxylamine; chloride; bromide; iodide; organic compounds containing nitro groups; hexavalent chromium; ferricyanide; ferrocyanide; and pyrazole compounds. Components such as these may not be harmful in some instances, but they have not been found to be needed or advantageous in compositions according to this invention, and their minimization is therefore normally preferred at least for reasons of economy.

The dissolved phosphate ions that constitute necessary component (A) may be obtained from a variety of sources as known in the art. Normally much of the phosphate content will be supplied by phosphoric acid added to the composition, and the stoichiometric equivalent as phosphate ions of all undissociated phosphoric acid and all its anionic ionization products in solution, along with the stoichiometric equivalent as phosphate ions of any dihydrogen phosphate, monohydrogen phosphate, or completely neutralized phosphate ions added to the composition in salt form, are to be understood as forming part of phosphate ions component (A), irrespective of the actual degree of ionization and/or reaction to produce some other chemical species that exists in the composition. If any metaphosphoric acid, other condensed phosphoric acids, or salts of any of these acids are present in the compositions, their stoichiometric equivalent as phosphate is also considered part of component (A). Generally, however, it is preferred, at least partly for reasons of economy, to utilize orthophosphoric acid and its salts as the initial source for component (A). (The formation of complex phosphomolybdate ions in a final composition according to the invention is believed likely to occur, but the precise chemical nature and concentration(s) of any such species formed are not known.)

In a working passivating aqueous liquid composition according to the invention, the concentration of phosphate ions and/or their stoichiometric equivalents as noted above preferably is at least, with increasing preference in the order given, 2.0, 3.0, 4.0, 5.0, 6.0, 7.0, 8.0, 9.0, 10.0, 10.5, 11.0, 11.5, 12.0, or 12.2 grams per liter (hereinafter usually abbreviated as "g/L") of total composition and independently preferably is not more than, with increasing preference in the order given, 200, 100, 80, 70, 65, 60, 55, 50, 46, 43, 40, 30, 27, 24, 21, 19, 17, 15, or 13 g/L.

The dissolved and/or dispersed substance(s) which contain molybdenum in a valence state lower than +6 and constitute the second necessary component of a working passivating aqueous liquid composition according to the invention are preferably, at least in part for reasons of economy, provided by in situ reaction between molybdenum trioxide (in which molybdenum has the +6 valence state) and a reducing agent in the presence of water and phosphate ions, preferably, in order to complete the reaction within a reasonable time, at a temperature well above normal ambient temperature. This reaction preferably is caused to occur in a mixture which comprises, more preferably consists essentially of, or still more preferably consists of, water, molybdenum trioxide, orthophosphoric acid, and reducing agent and which is suitable for use, after this reaction, as a make-up concentrate composition according to the invention that, when diluted with water only, supplies all of components (A), (B), (C), and (D) as defined above that are needed in a working passivating aqueous liquid composition according to the invention. In such a concentrate make-up composition: (i) the amount of molybdenum trioxide used preferably is at least, with increasing preference in the order given, 20, 40, 60, 70, 80, 85, 90, 95, 100, 105, 108, 111, or 113 grams per kilogram of the total amount of material mixed (hereinafter usually abbreviated as "g/kg") and independently preferably is not more than, with increasing preference in the order given, 400, 350, 300, 250, 200, 175, 155, 140, 130, 125, 120, or 115 g/kg; (ii) independently, the amount of phosphate ions used preferably is at least, with increasing preference in the order given, 20, 40, 60, 70, 75, 80, 85, 90, 95, or 100 g/kg and independently preferably is not more than, with increasing preference in the order given, 700, 600, 550, 500, 475, 450, 445, 435, 430, 400, 350, 300, 250, 200, 150, or 125 g/kg; (iii) independently, the amount of reducing agent used preferably is at least, with increasing preference in the order given, 2, 4, 6, 8, 10, 12, 14, 16, 18, 30, 50, 70, or 90 g/kg and independently preferably is not more than, with increasing preference in the order given, 200, 175, 150, 125, or 100 g/kg; (iv) all other ingredients constitute the balance of the material mixed to form the concentrate make-up composition; and (v) independently, the ratio of the amount of molybdenum trioxide to the amount of phosphate ions mixed to prepare the concentrate make-up composition is at least 0.20:1.0, 0.30:1.0, 0.35:1.0, 0.45:1.0, 0.65:1.0, 0.75:1.0, 0.85:1.0, 0.95:1.0, or 1.05:1.0 and independently preferably is, with increasing preference in the order given, not more than 4.0:1.0, 3.5:1.0, 3.0:1.0, 2.5:1.0, 2.0:1.0, 1.5:1.0, 1.3:1.0, or 1.2:1.0. All of these stated preferences also apply to concentrate make-up composition prepared in any other way, except that the stoichiometric equivalent as $MoO_3$ of the total molybdenum content of components (B) and (D) as described above is substituted for the amount of $MoO_3$ specified in the preferences in this paragraph.

Only actual reducing agent is preferably mixed with other ingredients as noted in the immediately preceding paragraph to prepare a passivating aqueous liquid concentrate composition according to the invention, but one or more products from the reduction effected by the reducing agent may of course remain in the composition. The reducing agent added initially preferably is selected from the group consisting of organic compounds in which the ratio of oxygen atoms to carbon atoms is at least, with increasing preference in the order given, 0.3:1.0, 0.6:1.0, 0.7:1.0, or 0.8:1.0 and independently preferably is not more than, with increasing preference in the order given, 1.5:1.0, 1.3:1.0, or 1.1:1.0. Independently, primarily for reasons of economy, the reducing agent is preferably selected from substances containing no atoms other than carbon, oxygen, and hydrogen, and most preferably is starch. Whatever the reducing agent used, it preferably is sufficiently effective as a reducing agent and is used in a sufficient amount to react with the preferred amounts of molybdenum trioxide as given above in the presence of water and the preferred amounts of phosphoric acid as given above to convert the entire amount of molybdenum trioxide used into one or more soluble and/or stably dispersed molybdenum-containing substances, in which at least part of the molybdenum is in a valence state lower than +6.

The amount of molybdenum that is in a valence state lower than +6 in a composition according to the invention may be and preferably is measured by titration of a sample of the composition with potassium permanganate solution to a color change from blue or green to yellow, orange, or brown. This method indicates that not nearly all of the total dissolved and/or stably dispersed molybdenum atoms in most preferred concentrate make-up compositions according to the invention are in a lower valence state. (A consequence of this fact is that the presence of optional component (D) in a passivating aqueous liquid composition according to the invention is normally preferred.) Inasmuch as the actual valence state or states lower than +6 in which molybdenum atoms exist in compositions according to the invention are not known, for convenience in calculation it is assumed that all such atoms are in the +5 valence state. Based on this assumption and a measurement by titration as described above, it has been found to be preferred, based primarily on the degree of corrosion protection achieved, for the fraction of dissolved solved and/or stably dispersed molybdenum atoms in a composition according to the invention that are in a valence state lower than +6 to be at least, with increasing preference in the order given, 1.0, 2.0, 3.0, 4.0, 5.0, 6.0, 7.0, 7.5, 8.0, 8.5, 9.0, 9.3, or 9.5% and independently dependently preferably to be not more than, with increasing preference in the order given, 30, 25, 20, 15, or 10%.

It is also normally preferred that at least one of optional components (E) and (F) should be present in at least working compositions according to the invention, because the presence of at least one of these components normally increases the corrosion protection and/or the resistance to discoloration of the passivated surface formed. Normally fluoride-containing component (E) is more preferred than component (F), particularly when selected from the group consisting of fluozirconic acid, fluotitanic acid, fluosilicic acid, fluoboric acid, and the salts of all these acids. Fluozirconic acid and its salts are most preferred. In a working passivating aqueous liquid composition according to the invention, the total concentration of fluorine atoms in anions in component (E) preferably is at least, with increasing preference in the order given, 0.02, 0.04, 0.06, 0.08, 0.10, 0.15, 0.20, 0.22, or 0.24 g/L and independently preferably is, primarily for reasons of economy, not more than, with increasing preference in the order given, 2.0, 1.5, 1.0, 0.80, 0.70, 0.60, 0.50, 0.45, 0.40, 0.35, 0.30, 0.28, or 0.26 g/L.

If component (F) is present in a working or a concentrate passivating aqueous liquid composition according to the invention, it is preferably selected from silica and/or alumina in colloidally dispersed form.

Surfactant component (G) is not normally needed, but in some cases may be advantageous to promote thorough and uniform wetting of the surface to be passivated.

A working passivating aqueous liquid composition according to the invention preferably has a pH value that is not more than, with increasing preference in the order given, 5, 3, 2.5, 2.2, 1.9, or 1.7 and independently preferably is at least, with increasing preference in the order given, −1.0, −0.5, 0.0, 0.5, 0.70, 0.80, 0.85, 0.90, 0.95, or 1.0.

A process according to the invention in its simplest form consists of bringing a metal surface to be passivated into physical contact with a working composition according to the invention as described above for a period of time, then discontinuing such contact and drying the surface previously contacted. Physical contact and subsequent separation can be accomplished by any of the methods well known in the metal treatment art, such as immersion for a certain time, then discontinuing immersion and removing adherent liquid by drainage under the influence of natural gravity or with a squeegee or similar device; spraying to establish the contact, then discontinuing the spraying and removing excess liquid as when contact is by immersion; roll coating of the amount of liquid followed by drying into place, and the like.

Preferably the temperature of the working passivating aqueous liquid composition during a passivation process according to the invention is at least, with increasing preference in the order given, 15°, 20°, 25°, 30°, 34° or 37° C. and independently preferably, primarily for reasons of economy, is not more than 66°, 60°, 55°, or 50° C. The quality of the passivation layer formed is not known to be substantially affected by the temperature during passivating if the temperature is within any of these preferred limits; the primary reason for the preference for a minimum temperature during passivating that is greater than the normal ambient temperature is that with such a passivating temperature and squeegeeing off of any adherent liquid promptly after discontinuing contact of the surface to be passivated with a working passivating aqueous liquid composition according to the invention, the surface will dry spontaneously in ambient air within a few seconds to form a passivated surface according to the invention. This method of operation is particularly well adapted to most existing coil processing plants.

The time during which physical contact is maintained between the metal surface to be passivated and a working passivating aqueous liquid composition according to the invention preferably, for reasons of economy of operation, is as short as possible, consistent with formation of a passivating layer as effective as desired. More specifically, the time of contact preferably is not more than, with increasing preference in the order given, 200, 150, 100, 75, 50, 40, 30, 25, 20, 15, 13, 11, 10, 9.0, 8.0, 7.0, 6.0, 5.0, 4.0, 3.0, 2.0, 1.5, or 1.0 seconds. Spraying a heated working passivating aqueous liquid composition onto the surface to be passivated followed by removing excess liquid with a squeegee has been found effective in forming a passivated surface according to this invention within a few seconds at most.

Normally the surface to be passivated preferably is not rinsed with water or other diluent between contact with a working passivating aqueous liquid composition according to the invention and drying. Drying can be accomplished by simple exposure to ambient air for a sufficient time, and indeed is preferably accomplished in this way if the passivated surface has been formed at a sufficiently high temperature that drying occurs within a few seconds of separation from contact with the working passivating aqueous liquid composition according to the invention as described above. Alternatively, one may hasten the drying by exposure of the wet surface after passivation to a higher temperature than the normal ambient temperature, in an oven or by any of the other means such as infrared radiant heating, microwave drying, and the like well known per se in the art.

The passivating coating formed in a process according to the invention includes molybdenum in sufficient amounts to be coating is thick fluorescence. Preferably, the coating is thick enough that the amount of molybdenum added-on during the passivation process, including drying after the contact with a working passivating aqueous liquid composition according to the invention corresponds to at least, with increasing preference in the order given, 1.0, 3.0, 5.0, 7.0, 9.0, 10.0, or 10.5 milligrams per square meter of the metal surface passivated (hereinafter usually abbreviated as "mg/m$^2$"), measured as molybdenum atoms, and if very high corrosion resistance is needed more preferably is at least, with increasing preference in the order given, 12, 15, 20, 25, 30, or 32 mg/m$^2$ measured as molybdenum atoms and independently preferably, primarily for reasons of economy, corresponds to not more than 100, 75, 65, 55, 50, 45, 40, or 35 mg/m$^2$ measured as molybdenum atoms. The amount of molybdenum added-on may conveniently be measured with a commercially available instrument, a PORTASPEC™ Model 2501 X-ray spectrograph from Cianflone Scientific, or by other means known to those skilled in the art.

After forming the initial passivating layer as described above, it is normally preferred to further improve the corrosion and/or staining resistance of the passivated surface face by overcoating it with a protective layer containing at least an organic binder. Any of a wide variety of clear and pigmented paints and like materials, as generally known per se in the art can be used for this purpose. A particularly useful type of overcoating for many purposes is a clear acrylic coating formed by drying into place a liquid layer of acrylic latex emulsion formed on the initially passivated surface. Such an overcoating preferably has a thickness after drying that is at least, with increasing preference in the order given, 0.2, 0.4, 0.6, 0.8, or 1.0 micrometers (hereinafter usually abbreviated as "μm") and independently preferably, primarily for reasons of economy, is not more than 10, 7, 5, 3, 2.5, 2.0, 1.5, or 1.3 μm. When the passivated surface is to be used in an application where a metallic appearance is desired, as in roofing for example, this relatively thin clear acrylic overcoating can serve adequately as the final coating layer in many instances. For more severe service, additional thicker coatings of paint and like materials adapted to a specific purpose as known per se in the art may be applied directly over this initial thin acrylic overcoating, or directly over the passivated metal surface itself.

Before passivating according to this invention is to be used for any metal substrate, the substrate to be passivated is preferably thoroughly cleaned by any of various methods well known to those skilled in the art to be suitable for the particular substrate to be coated.

The practice of this invention may be further appreciated by consideration of the following, non-limiting examples, and the benefits of the invention may be appreciated by contrast with the comparison examples set forth below and additional comparisons known to those skilled in the art.

Preparation of Concentrate Make-Up Compositions According to the Invention

The amounts of materials shown in Table 1 were used to make five concentrates according to the invention.

TABLE 1

| Ingredient | Parts of Ingredient in Composition #: | | | | |
|---|---|---|---|---|---|
| | C-1 | C-2 | C-3 | C-4 | C-5 |
| Deionized Water | 583 | 354 | 549 | 320 | 226 |
| 75% Aqueous H$_3$PO$_4$ | 114 | 343 | 114 | 343 | 114 |
| Starch | 11.4 | 11.4 | 45.7 | 45.7 | 14.3 |
| Molybdenum Trioxide | 91.4 | 91.4 | 91.4 | 91.4 | 45.7 |

All the materials shown in Table 1 except the MoO$_3$ formed a solution, which was boiled in contact with the solid MoO$_3$ for one hour or until all the MoO$_3$ had dissolved. This produced a concentrate composition with a dark blue color but no visually apparent separate rate solid phase. These concentrates had the characteristics shown in Table 2.

TABLE 2

| Characteristic | Value of Characteristic in Composition #: | | | | |
|---|---|---|---|---|---|
| | C-1 | C-2 | C-3 | C-4 | C-5 |
| Specific Gravity | 1.18 | 1.35 | 1.19 | 1.37 | 1.26 |
| % of Mo Atoms with Valence < 6 | 3.15 | 7.71 | 9.36 | 19.6 | 15.8 |

Working Compositions According to the Invention

The first four of the concentrate make-up compositions as described above were used to prepare working compositions that contained 10 by volume of the liquid concentrate make-up compositions. In some instances, aqueous fluozirconic acid was also added to the working compositions, to produce the working composition concentrations shown in Table 3 below.

TABLE 3

| Working Composition Number | Grams per Liter in Working Composition of: | | | |
|---|---|---|---|---|
| | PO$_4^{-3}$ Ions | Mo as MoO$_3$ | Starch | H$_2$ZrF$_6$ |
| W-1.1 | 12.3 | 13.4 | 1.6 | none |
| W-1.2 | 12.3 | 13.4 | 1.6 | 0.45 |
| W-2.1 | 42.7 | 15.6 | 1.6 | none |
| W-2.2 | 42.7 | 15.6 | 1.6 | 0.45 |
| W-3.1 | 12.3 | 13.4 | 7.8 | none |
| W-3.2 | 12.3 | 13.4 | 7.8 | 0.45 |
| W-4.1 | 42.7 | 15.6 | 7.8 | none |
| W-4.2 | 42.7 | 15.6 | 7.8 | 0.45 |

Passivating Processes

Test panels of GALVALUME™ sheet, which is steel sheet coated with an alloy of 55% Al, 1.6% Si, and 43.4% Al and is a product of Bethlehem Steel Corporation, were cleaned in a cleaning solution prepared from PARCO® Cleaner 338, which is a commercial cleaner recommended for cleaning aluminiferous and zinciferous surfaces, is available from the Parker Amchem Division of Henkel Corporation, Madison Heights, Mich., U.S.A., and was used according to the manufacturer's directions. The cleaned panels were then rinsed with water and subsequently immersed for a period of time noted below in a working composition according to the invention, which was maintained at a temperature of 49° to 54° C., or in a comparison passivating composition as also described below. The passivated panels were then removed from contact with the passivating composition and allowed to dry in ambient air. Drying was complete within 5 seconds. In some instances as shown in the Tables, the thus passivated and dried surfaces were further coated with a mixture of 50% each of RHOP- LEX™ HA-16 and AC-73 acrylic latex emulsions. (These emulsions were commercially supplied by Rohm & Haas Company.) The thickness of the acrylic coating was controlled to be equivalent to 1.0±0.2 μm after drying and the coating was then dried into place on the passivated surface without rinsing. Panels were then physically tested. Some results are shown in Tables 4 and 5.

TABLE 4

RESULTS OF ASTM D4585-87 TEST ("CLEVELAND CONDENSATION")

| Process Test Number | Working Composition Used | Passivating Time, Seconds | Test Results After Exposure Time Shown: | | | |
|---|---|---|---|---|---|---|
| | | | Without Acrylic Coat | | With Acrylic Coat | |
| | | | 72 Hrs | 672 Hrs | 72 Hrs | 672 Hrs |
| 1 | W-1.1 | 5 | 4 | n.m. | 10 | 9 |
| 2 | W-1.2 | 20 | 6 | 1 | 1 | 6 |
| 3 | W-2.1 | 30 | 4 | n.m. | 10 | 8 |
| 4 | W-2.2 | 20 | 4 | n.m. | 10 | 9 |
| 5 | W-3.1 | n.r. | 5 | n.m. | 10 | 8 |
| 6 | W-3.2 | n.r. | 6 | 0 | 10 | 10 |
| 7 | W-4.1 | n.r. | 2 | n.m. | 10 | 6 |
| 8 | W-4.2 | n.r. | 1 | n.m. | 10 | 5 |
| 9 | See Note 1 | n.k. | 10 | 10 | n.a. | n.a. |
| 10 | See Note 2 | n.r. | n.a. | n.a. | 10 | 10 |

Numbered Notes for Table 4
1 This process, which was not according to the invention, used commercially supplied "mill passivated" panels from National Steel Corp., which are believed to have been passivated by a process requiring the use of hexavalent chromium.
2 This process, which was not according to the invention, utilized a conventional prior art mixed hexavalent chromium and acrylic emulsion passivating process; it did not have a separate acrylic coating thereafter, but because of the presence of acrylic in the passivating layer itself, the results are listed under the column "With Acrylic Coat".
Abbreviations for Table 4
ASTM = American Society for Testing and Materials; Hrs = Hours; n.m. = not measured; n.r. = not recorded, but estimated to be 20 to 30 seconds; n.k. = not known; n.a. = not applicable.

TABLE 5

RESULTS OF "STACK TEST" AT 70° C. AND 100% RELATIVE HUMIDITY

| Process Test Number | Acrylic Top Coat Used? | Rating after Exposure for: | | | |
|---|---|---|---|---|---|
| | | 168 Hours | 336 Hours | 504 Hours | 672 Hours |
| 11* | No | 9 | n.m. | n.m. | 6.7 |
| 12* | Yes | 10 | 10 | 10 | 10 |
| See Note 1 | n.a. | 10 | 9.0 | 8.0 | 4.3 |
| See Note 2 | n.a. | 10 | 10 | 10 | 10 |

Numbered Notes for Table 5
1 This process, which was not according to the invention, used commercially supplied "mill passivated" panels from National Steel Corp., which are believed to have been passivated by a process requiring the use of hexavalent chromium.
2 This process, which was not according to the invention, utilized a conventional prior art mixed hexavalent chromium and acrylic emulsion passivating process.
Footnote for Table 5
*The working composition according to the invention used for this process test was made in the same general manner as described above for other working compositions according to the invention, but it contained 12.1 g/L of $PO_4^{-3}$ ions from $H_3PO_4$ used in making the corresponding concentrate make-up composition, 6.7 g/L of molybdenum, measured as its stoichiometric equivalent as $MoO_3$, 1.7 g/L of starch, and no other ingredients except water, counterions, and reaction products of the four ingredients (i.e., $H_2O$, $H_3PO_4$, $MoO_3$, and starch mixed to make the concentrate.

TABLE 5-continued

RESULTS OF "STACK TEST" AT 70° C. AND 100% RELATIVE HUMIDITY

| Process Test Number | Acrylic Top Coat Used? | Rating after Exposure for: | | | |
|---|---|---|---|---|---|
| | | 168 Hours | 336 Hours | 504 Hours | 672 Hours |

Other Note for Table 5
In the "stack test", an assembly of six panels is placed one atop another so that passivated sides are touching each other, then exposed in a controlled atmosphere cabinet to the conditions noted in the title of the table. After exposure, the passivated surfaces were separated and examined visually. The ratings are on a scale of 0 (worst, completely blackened surface) to 10 (best, no staining or other discoloration of the surface).

In addition to the tests noted in Tables 4 and 5, a panel prepared in the same manner as for Process Test 12 in Table 5 and three controls, specifically an unpassivated sample and samples treated in the same manner as in numbered notes 1 and 2 in Table 5 were tested by exposure to steam and water: Each panel tested was used to cover a beaker in which water was boiling from a liquid volume of one-fifth to one-half of the total capacity of the beaker, with the tested surface of the panel facing down, so that it functioned as a reflux condenser for the steam boiling from the water below. The unpassivated test panel turned black within 5 minutes of exposure to these conditions, while the other three panels mentioned remained unblackened after 30 minutes of such exposure.

The invention claimed is:
1. An aqueous liquid composition suitable for use either directly as such or after dilution with water to passivate a metallic surface that consists predominantly of aluminum, zinc, or both, said composition comprising water and:
 (A) dissolved phosphate anions; and
 (B) dissolved, stably dispersed, or both dissolved and stably dispersed molybdenum-containing anions, compounds, or both compounds and anions in which molybdenum has an oxidation state less than +6.
2. A concentrate composition according to claim 1, said composition consisting essentially of water and:
 (A) an amount from about 20 to about 500 g/kg of dissolved phosphate anions;
 (B) dissolved, stably dispersed, or both dissolved and stably dispersed molybdenum-containing anions, compounds, or both compounds and anions in which molybdenum has an oxidation state less than +6; and, optionally, one or more of the following:
 (C) an amount of from about 2 to about 125 g/kg of a dissolved, stably dispersed, or both dissolved and stably dispersed component selected from the group consisting of reducing agents, non-molybdenum-containing products from reactions in which the reducing agents reduce other material, or both, said reducing agents and products from reactions thereof not being part of either of previously recited components (A) and (B);
 (D) dissolved, stably dispersed, or both dissolved and stably dispersed molybdenum-containing anions, compounds, or both compounds and anions which are not part of any of previously recited components (A) through (C) and in which molybdenum has an oxidation state of +6, components (B) and (D) jointly containing a total amount of molybdenum, measured as its stoichiometric equivalent as $MoO_3$, that is from about 20 to about 200 g/kg and the ratio of the total amount of molybdenum in components (B) and (D), measured as its stoichiometric equivalent as $MoO_3$, to the amount of phosphate ions being from about 0.20:1.0 to about 3.0:1.0;

(E) a dissolved component selected from the group consisting of simple and complex anions containing fluorine atoms, said anions not being part of any of previously recited components (A) through (D);

(F) a component of dissolved, stably dispersed, or both dissolved and stably dispersed metal oxide or metal oxides that are not part of any of the previously recited components (A) through (E); and (G) a component of surfactant that is not part of any of the previously recited components (A) through (F).

3. A concentrate composition according to claim 2, wherein: the amount of phosphate ions is from about 40 to about 430 g/kg; the ratio of the total amount of molybdenum, measured as its stoichiometric equivalent as $MoO_3$, in components (B) and (D) to the amount of phosphate ions is from about 0.35:1.0 to about 1.3:1.0; the reducing agent is selected from the group consisting of organic compounds in which the ratio of oxygen atoms to carbon atoms is from about 0.6:1.0 to about 1.5:1.0; and reducing agent was originally added to the composition in an amount of from about 6 to about 125 g/kg.

4. A concentrate composition according to claim 3, wherein: the amount of phosphate ions is from about 60 to about 300 g/kg; the ratio of the total amount of molybdenum, measured as its stoichiometric equivalent as $MoO_3$, in components (B) and (D) to the amount of phosphate ions is from about 0.45:1.0 to about 1.3:1.0; the reducing agent is selected from the group consisting of organic compounds in which the ratio of oxygen atoms to carbon atoms is from about 0.7:1.0 to about 1.3:1.0; and reducing agent was originally added to the composition in an amount of from about 18 to about 125 g/kg.

5. A concentrate composition according to claim 4, wherein: the amount of phosphate ions is from about 85 to about 250 g/kg; the ratio of the total amount of molybdenum, measured as its stoichiometric equivalent as $MoO_3$, in components (B) and (D) to the amount of phosphate ions is from about 0.65:1.0 to about 1.3:1.0; the reducing agent is selected from the group consisting of organic compounds in which the ratio of oxygen atoms to carbon atoms is from about 0.8:1.0 to about 1.2:1.0; and reducing agent was originally added to the composition in an amount of from about 30 to about 125 g/kg.

6. A concentrate composition according to claim 5, wherein: the amount of phosphate ions is from about 90 to about 150 g/kg; the ratio of the total amount of molybdenum, measured as its stoichiometric equivalent as $MoO_3$, in components (B) and (D) to the amount of phosphate ions is from about 0.85:1.0 to about 1.3:1.0; the reducing agent is selected from the group consisting of organic compounds in which the ratio of oxygen atoms to carbon atoms is from about 0.8:1.0 to about 1.1:1.0; and reducing agent was originally added to the composition in an amount of from about 50 to about 125 g/kg.

7. A concentrate composition according to claim 6, wherein: components (B) and (D) are formed by in situ reaction among orthophosphoric acid, starch, and molybdenum trioxide; the amount of phosphate ions is from about 100 to about 125 g/kg; the ratio of the total amount of molybdenum, measured as its stoichiometric equivalent as $MoO_3$, in components (B) and (D) to the amount of phosphate ions is from about 1.05:1.0 to about 1.2:1.0; the reducing agent is starch and was originally added to the composition in an amount of from about 70 to about 100 g/kg.

8. A working passivating aqueous liquid composition according to claim 1, said composition consisting essentially of:

(A) an amount from about 2.0 to about 80 g/kg of dissolved phosphate anions;

(B) dissolved, stably dispersed, or both dissolved and stably dispersed molybdenum-containing anions, compounds, or both compounds and anions in which molybdenum has an oxidation state less than +6; and, optionally, one or more of the following:

(C) a dissolved, stably dispersed, or both dissolved and stably dispersed component selected from the group consisting of reducing agents, non-molybdenum-containing products from reactions in which the reducing agents reduce other material, or both, said reducing agents and products from reactions thereof not being part of either of previously recited components (A) and (B);

(D) dissolved, stably dispersed, or both dissolved and stably dispersed molybdenum-containing anions, compounds, or both compounds and anions which are not part of any of previously recited components (A) through (C) and in which molybdenum has an oxidation state of +6, components (B) and (D) jointly containing a total amount of molybdenum, measured as its stoichiometric equivalent as $MoO_3$, such that the ratio of the total amount of molybdenum in components (B) and (D), measured as its stoichiometric equivalent as $MoO_3$, to the amount of phosphate ions is from about 0.20:1.0 to about 3.0:1.0;

(E) a dissolved component selected from the group consisting of simple and complex anions containing fluorine atoms, said anions not being part of any of previously recited components (A) through (D);

(F) a component of dissolved, stably dispersed, or both dissolved and stably dispersed metal oxide or metal oxides that are not part of any of the previously recited components (A) through (E); and (G) a component of surfactant that is not part of any of the previously recited components (A) through (F).

9. A working composition according to claim 8, wherein: the amount of phosphate ions is from about 4.0 to about 70 g/L; the ratio of the total amount of molybdenum, measured as its stoichiometric equivalent as $MoO_3$, in components (B) and (D) to the amount of phosphate ions is from about 0.35:1.0 to about 1.3:1.0; and the reducing agent is selected from the group consisting of organic compounds in which the ratio of oxygen atoms to carbon atoms is from about 0.6:1.0 to about 1.5:1.0.

10. A working composition according to claim 9, wherein: the amount of phosphate ions is from about 6.0 to about 46 g/L; the ratio of the total amount of molybdenum, measured as its stoichiometric equivalent as $MoO_3$, in components (B) and (D) to the amount of phosphate ions is from about 0.65:1.0 to about 1.3:1.0; the reducing agent is selected from the group consisting of organic compounds in which the ratio of oxygen atoms to carbon atoms is from about 0.7:1.0 to about 1.3:1.0; and component (E) is present in the composition in an amount such that its stoichiometric equivalent as fluorine atoms is from about 0.06 to 1.0 g/L.

11. A working composition according to claim 10, wherein: the amount of phosphate ions is from about 6.0 to about 46 g/L; the ratio of the total amount of molybdenum, measured as its stoichiometric equivalent as $MoO_3$, in components (B) and (D) to the amount of phosphate ions is from about 0.75:1.0 to about 1.3:1.0; the reducing agent is selected from the group consisting of organic compounds in which the ratio of oxygen atoms to carbon atoms is from about 0.7:1.0 to about 1.1:1.0; and component (E) is present in the composition in an amount such that its stoichiometric equivalent as fluorine atoms is from about 0.10 to 0.60 g/L and is selected from the group consisting of fluozirconic acid, fluotitanic acid, fluosilicic acid, fluoboric acid, and salts of all these acids.

12. A working composition according to claim 11, wherein: the amount of phosphate ions is from about 9.0 to about 17 g/L; the ratio of the total amount of molybdenum, measured as its stoichiometric equivalent as $MoO_3$, in components (B) and (D) to the amount of phosphate ions is from about 0.85:1.0 to about 1.3:1.0; the reducing agent is selected from the group consisting of organic compounds in which the ratio of oxygen atoms to carbon atoms is from about 0.8:1.0 to about 1.1:1.0; and component (E) is present in the composition in an amount such that its stoichiometric equivalent as fluorine atoms is from about 0.15 to 0.45 g/L.

13. A working composition according to claim 12, wherein: components (B) and (D) are formed by in situ reaction among orthophosphoric acid, starch, and molybdenum trioxide; the amount of phosphate ions is from about 11.0 to about 13.0 g/L; the ratio of the total amount of molybdenum, measured as its stoichiometric equivalent as $MoO_3$, in components (B) and (D) to the amount of phosphate ions is from about 1.05:1.0 to about 1.2:1.0; and the composition contains a total from about 0.20 to about 0.35 g/L of fluorine atoms from added fluozirconic acid and salts thereof.

14. A process of forming a coating protective against corrosion on a metal alloy surface, the composition of the alloy being about 55% Al, about 43.5% Zn, and about 1.5% Si, said process comprising steps of:

(I) bringing the metal alloy surface into physical contact with a working passivating aqueous liquid composition according to claim 13 at a temperature from about 37° to about 50° C. for a time not greater than about 20 seconds;

(II) after completion of the physical contact recited in step (I), removing liquid from the metal alloy surface by physical contact of an elastomeric solid wiping device therewith, without rinsing with any liquid, and drying the remaining working passivating aqueous liquid composition into place on the metal alloy surface, to produce a passivated surface; and (III) coating the passivated surface formed in step (II) with a coating of a dispersion of solid acrylic polymers in water in an amount corresponding to from about 10 to about 35 mg/m² of said solid acrylic polymers; and (IV) without any intermediate rinsing with any liquid, drying the coating formed in step (III) into place over the passivated surface to form the coating protective against corrosion.

15. A process of forming a coating protective against corrosion on a metal surface consisting predominantly of aluminum, zinc, or a mixture of aluminum and zinc, said process comprising steps of:

(I) bringing the metal alloy surface into physical contact with a working passivating aqueous liquid composition according to claim 12 at a temperature within the range from about 34° to about 55° C. for a time sufficient that, after completion of the process, the mass of molybdenum per unit area of the surface will be increased by an amount of at least about 10.5 mg/m² but not more than about 35 mg/m²; and (II) after completion of the physical contact recited in step (I), drying any remaining working passivating aqueous liquid composition, optionally after removing some part of it, into place on the metal alloy surface, to produce a passivated surface.

16. A process of forming a coating protective against corrosion on a metal surface consisting predominantly of aluminum, zinc, or a mixture of aluminum and zinc, said process comprising steps of:

(I) bringing the metal alloy surface into physical contact with a working passivating aqueous liquid composition according to claim 11 at a temperature within the range from about 30° to about 60° C. for a time sufficient that, after completion of the process, the mass of molybdenum per unit area of the surface will be increased by an amount of at least about 10.5 mg/m² but not more than about 35 mg/m²; and (II) after completion of the physical contact recited in step (I), drying any remaining working passivating aqueous liquid composition, optionally after removing some part of it, into place on the metal alloy surface, to produce a passivated surface.

17. A process of forming a coating protective against corrosion on a metal surface consisting predominantly of aluminum, zinc, or a mixture of aluminum and zinc, said process comprising steps of:

(I) bringing the metal alloy surface into physical contact with a working passivating aqueous liquid composition according to claim 10 at a temperature within the range from about 30° to about 60° C. for a time sufficient that, after completion of the process, the mass of molybdenum per unit area of the surface will be increased by an amount of at least about 10.5 mg/m² but not more than about 35 mg/m²; and (II) after completion of the physical contact recited in step (I), drying any remaining working passivating aqueous liquid composition, optionally after removing some part of it, into place on the metal alloy surface, to produce a passivated surface.

18. A process of forming a coating protective against corrosion on a metal surface consisting predominantly of aluminum, zinc, or a mixture of aluminum and zinc, said process comprising steps of:

(I) bringing the metal alloy surface into physical contact with a working passivating aqueous liquid composition according to claim 9 at a temperature within the range from about 30° to about 60° C. for a time sufficient that, after completion of the process, the mass of molybdenum per unit area of the surface will be increased by an amount of at least about 10.5 mg/m² but not more than about 35 mg/m²; and (II) after completion of the physical contact recited in step (I), drying any remaining working passivating aqueous liquid composition, optionally after removing some part of it, into place on the metal alloy surface, to produce a passivated surface.

19. A process of forming a coating protective against corrosion on a metal surface consisting predominantly of aluminum, zinc, or a mixture of aluminum and zinc, said process comprising steps of:

(I) bringing the metal alloy surface into physical contact with a working passivating aqueous liquid composition according to claim 8 at a temperature of at least 20° C. for a time sufficient that, after completion of the process, the mass of molybdenum per unit area of the surface will be increased by an amount of at least 3.0 mg/m²; and (II) after completion of the physical contact recited in step (I), drying any remaining working passivating aqueous liquid composition, optionally after removing some part of it, into place on the metal alloy surface, to produce a passivated surface.

20. An article of manufacture comprising a surface protected against corrosion by a process according to claim 19.

* * * * *